INVENTOR:
JOHN G. HUMPHREY,
BY Julius J. Zaskalicky
HIS ATTORNEY.

3,290,605

PHASE REVERSAL CIRCUIT

John G. Humphrey, Mattydale, N.Y., assignor to General Electric Company, a corporation of New York Filed Nov. 15, 1963, Ser. No. 323,975
8 Claims. (Cl. 328—155)

The present invention relates in general to phase reversal circuits, and in particular relates to a circuit for alternating the phase of an electrical wave of high frequency from one phase to the opposite phase in response to electrical pulses of low frequency.

Heretofore, phase reversal in a train of high frequency carrier waves has been accomplished in several ways. In one such method high frequency waves of one phase are applied to an amplifier and the same waves in opposite phase are applied to another amplifier having a common output with one amplifier. The amplifiers are alternately rendered active in response to low frequency gating signals to alter the phase of the output waves in accordance with the gating pulses. In another method a multivibrator including a pair of electron discharge devices is keyed from a condition of conduction in one device to a condition of conduction in the other device in response to applied pulses. High frequency carrier waves of one and the opposite phase are applied to the one and the other of the electron discharge devices. The one of the electron discharge device which is rendered conductive functions as an amplifier to pass waves of corresponding phase to a common output. While the latter arrangement is simpler than the former, the multivibrator thereof is subject to false firing by the applied high frequency carrier waves.

Accordingly, an object of the present invention is to provide improvements in circuits for reversing the phase of high frequency electrical waves.

Another object of the present invention is to provide a simple phase reversing circuit for high frequency electrical waves whcih uses a minimum of circuit elements.

A further object of the present invention is to provide a highly reliable phase reversing circuit for high frequency electrical waves.

In accordance with an illustrative embodiment of the present invention there is provided a transformer having a primary winding and a secondary winding, a load impedance, means for capacitively coupling each of the ends of the secondary winding to one end of the load impedance, and means for coupling alternately each of the aforementioned ends of the secondary winding to the other end of the load impedance. The latter means includes a bi-stable multivibrator having a pair of current controlling devices in which conduction is switched from one device to the other in response to applied electrical pulses of low frequency. The conduction path of each of the electron discharge devices, with suitable high frequency by-pass to the aforementioned other end of the load impedance, includes a respective end of the secondary winding. Accordingly, when high frequency waves are applied to the primary of the transformer, an output is obtained across the load impedance in which the phase thereof alternates in accordance with alternations in conduction in the current controlling devices of the multivibrator and in sequence with the applied low frequency electrical pulses.

The novel features believed characteristic of the invention are set forth in the appended claims. The invention, itself, together with further objects and advantages thereof may best be understood by reference to the following description taken in connection with the accompanying drawings in which:

Figure 1:
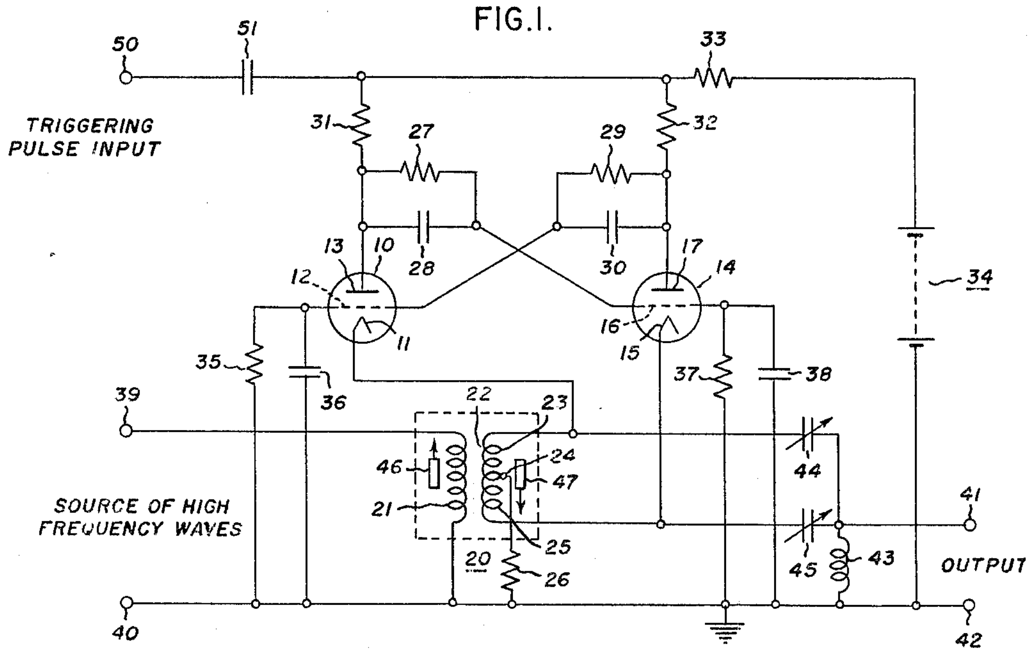
FIGURE 1 is a circuit embodiment of the present invention.

Referring now to FIGURE 1 there is shown a bi-stable multivibrator including an electron discharge device 10 having a cathode 11, a grid 12, and a plate 13, and another electron discharge device 14 also having a cathode 15, a grid 16, and a plate 17. There is also shown a transformer 20 having a primary winding 21 and a center tapped secondary winding 22 including one portion 23 on one side of the center tap 24, and another portion 25 on the other side of the center tap. One end or terminal of the one portion 23 is connected to the cathode 11. The other end or terminal of the other portion 25 is connected to the cathode 15. A resistance 26 is connected between the center tap 24 and ground. The plate 13 is connected through a parallel circuit of resistor 27 and capacitor 28 to grid 16. The plate 17 is connected through a parallel circuit of resistor 29 and capacitor 30 to gride 12. The plates 13 and 17 are connected through respective load resistors 31 and 32 and a common resistor 33 to the positive terminal of source 34, the negative terminal of which is connected to ground. Grid 12 is connected through grid resistor 35 by-passed for high frequency oscillations by capacitor 36 to ground. Grid 16 is connected through grid resistor 37 and by-passed for high frequency oscillations by capacitor 38 to ground.

A pair of input terminals 39 and 40 are provided, the latter being connected to ground. The primary winding 21 of the transformer is connected across the input terminals 39 and 40. A pair of output terminals 41 and 42 are provided, the latter of which is connected to ground. A load impedance shown as inductor 43 is connected across the output terminals. The ungrounded output terminal 41 is connected through a variable capacitor 44 to one end of the secondary winding 22, and is also connected through another variable capacitor 45 to the other end of the secondary winding of the transformer. The transformer 20 is of the air core type in which the primary is tuneable by magnetic slug 46 moveable in position in the winding and the secondary of which is also tuneable by means of magnetic slug 47 moveable in position in the winding. The slug 46 tunes the inductance of the primary winding to resonate with the distributed capacitance of the primary winding (not shown) at the frequency of the input high frequency waves. The secondary winding 22 is tuneable by slug 47 to resonate with the capacitance in shunt therewith including the capacitance of variable capacitors 44 and 45. Another input terminal 50 coupled to the junction of resistances 31 and 33 through capacitor 51 is provided. Triggering pulses for altering the conduction from one electron discharge device to the other are applied between input terminals 50 and 40.

Figures 2A, 2B, 2C, 2D:
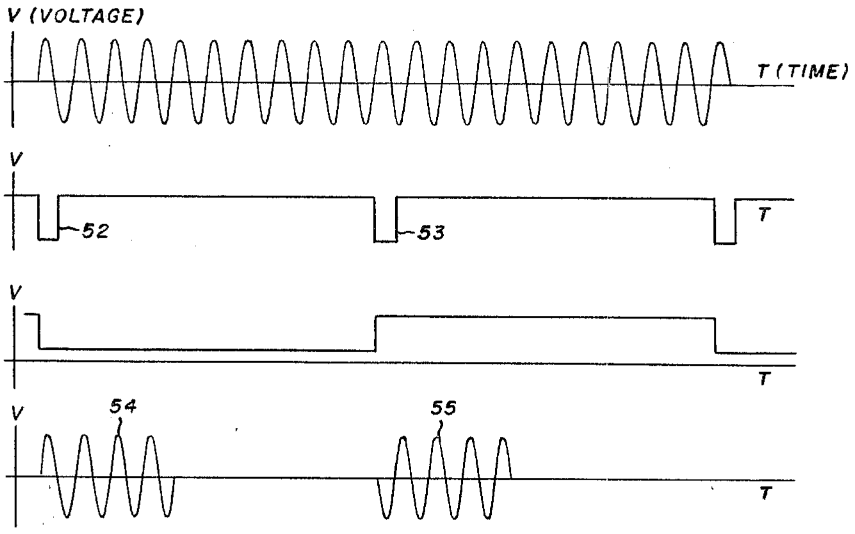
FIGURES 2A through 2D show diagrammatic representations of voltage waves at various points in the circuit of FIGURE 1.

The operation of the circuit of FIGURE 1 will be more readily understood in connection with the graphical representations of voltage as a function of time at various points in the circuit shown in FIGURES 2A through 2D. FIGURE 2A shows the high frequency voltage waves applied between input terminals 39 and 40. FIGURE 2B shows the pulses of voltage periodically applied between input terminals 50 and 40.

FIGURE 2C shows the variation of voltage at the plate 17 of electron discharge device 14. On appearance of a pulse 52 of FIGURE 2B, the electron discharge device 14 is rendered conductive thereby causing the plate voltage thereof to drop and remain so until the next succeeding pulse 53 of FIGURE 2B renders the electron discharge device 14 non-conductive. The state of conduction of electron discharge device 10 is just the inverse of that of electron discharge device 14, i.e., during the period of time that plate 17 has the maximum value, plate 15 has its minimum value and vice versa.

FIGURE 2D shows the manner in which the phase of the wave appearing at the output terminals 41 and 42 is altered in accordance with conduction in the electron discharge devices 10 and 14. When electron discharge device 14 is in conduction, the remote end of portion 25 of the secondary winding is connected through the electron discharge path of device 14 and the grid by-pass capacitor 38 to ground at the frequency of the high frequency waves. Thus, the output appearing across the secondary winding 22 is coupled through variable capacitor 44 to the ungrounded end load inductance 43. The waves appearing across the inductor 43 under such conditions of operation are shown at 54 in FIGURE 2D. Similarly, when electron discharge device 10 is in conduction, the remote end of portion 23 of the secondary winding is connected through the electron discharge path of the device 10 and the grid by-pass capacitor 36 to ground at the frequency of the high frequency waves. The output across the secondary winding 22 is coupled through coupling capacitor 45 to the load inductance 43. The waves appearing across the inductor 43 under such condition of operation is shown at 55 in FIGURE 2D with the phase indictaed opposite to the phase of the waves at 54. The variable capacitors 44 and 45 are tuneable to provide proper high frequency resonance of the resulting composite circuit including the secondary winding and the load inductor under each of the aforementioned conditions of operation. Thus the channel between the input terminals 39 and 40 and the output terminals 41 and 42 may be triple tuned to provide a very high degree of selectivity in the frequency of the waves passed from the input terminals 39 and 40 to the output terminals 41 and 42.

In graph of FIGURES 2A and 2D only a few cycles of high frequency waves have been shown for reasons of clarity. The frequency of the pulses of FIGURES 2B and 2C may be of the order of 60 cycles per second, and the frequency of the waves of FIGURES 2A and 2D may be many times greater, i.e., of the order of megacycles.

The circuit of the present invention thus involves a minimum of components, is highly reliable in that simply the switch action of the bi-stable multivibrator is used to switch to high frequency ground one or the other end of the secondary of the transformer.

The multivibrator shown in the drawing is a conventional multivibrator, except with respect to the provision of by-pass capacitors 36 and 38, in which the electron discharge devices thereof are alternately rendered conductive. Upon energizing of the multivibrator and upon the application of a triggering pulse 52 of negative polarity to the multivibrator the electron discharge device in conduction; for example, device 10 is rendered less conductive as the negative pulse lowers the potential at grid 12 with reference to the cathode 11. Such drop in current through the electron discharge device causes the potential at the plate 13 to rise which in turn is coupled through the resistor 27 and capacitor 28 to the grid 16 of the electron discharge device 14 tending to render it conductive and dropping the potential at the plate 17 thereof. Such drop in plate potential is coupled through the resistor 29 capacitor 30 network to the grid 12 of the electron discharge device 10 rendering it further less conductive. The sequence of operations described continues until electron discharge device 10 becomes non-conductive and electron discharge device 14 becomes fully conductive. Such a condition will continue to exist until another triggering pulse 53 is applied to the multivibrator at which time the cycle of operations described again takes place and electron discharge device 10 again becomes conductive and electron discharge device 14 non-conductive.

While the invention has been described in specific embodiments, it will be appreciated that many modifications may be made by those skilled in the art, and I intend by the appended claims to cover all such modifications and changes as fall within the true spirit and scope of the invention.

What I claim as new and desire to secure by Letters Patent of the United States is:

1. In combination, a transformer having a primary winding and a secondary winding, a load impedance, means for coupling each end of said secondary winding to one end of said load impedance, a resistance for coupling an intermediate point of said secondary winding to the other end of said load impedance, and means for coupling alternately each of the ends of said secondary winding to the other end of said load impedance.

2. In combination, a transformer having a primary winding and a secondary winding, a load impedance, means for applying waves of high frequency to said primary winding, means for coupling each end of said secondary winding to one end of said load impedance, a resistance for coupling an intermediate point of said secondary winding to the other end of said load impedance, and means for coupling alternately at a low frequency rate each of the ends of said secondary winding to the other end of said load impedance.

3. In combination, a transformer having a primary winding and a secondary winding, a load impedance, means for capacitively coupling each end of said secondary winding to one end of said load impedance, a resistance for coupling an intermediate point of said secondary winding to the other end of said load impedance, a pair of capacitors, one end of each of said capacitors connected to the other end of said load impedance, and means for alternately connecting each of the ends of said secondary winding to the other end of a respective capacitor.

4. In combination, a transformer having a primary winding and a secondary winding, an inductor, a pair of capacitors, each of said capacitors connecting a respective end of said secondary winding to one end of said inductor, a resistance for coupling an intermediate point of said secondary winding to the other end of said load impedance, another pair of capacitors, one end of each of said other pair of capacitors connected to the other end of said inductor, and means for alternately connecting each of the ends of said secondary winding to the other end of a respective one of said other pair of capacitors.

5. In combination, a transformer having a primary winding and a secondary winding, a load impedance, a pair of electron discharge devices each having an electron discharge path, means for capacitively coupling each end of said secondary winding to one end of said load impedance, a pair of capacitors, a resistance for coupling an intermediate point of said secondary winding to the other end of said load impedance, means for connecting one end of said secondary winding to the other end of said load impedance including a portion of the electron discharge path of one of said devices and one of said capacitors, and means for connecting the other end of said secondary winding to the other end of said load impedance including a portion of the electron discharge path of the other of said devices and the other of said capacitors, and means for rendering said electron discharge devices alternately conductive.

6. In combination, a transformer having a primary winding and a secondary winding, a load impedance, a pair of electron discharge devices each having an electron discharge path, means for capacitively coupling each end of said secondary winding to one end of said load impedance, a pair of capacitors, a resistance for coupling an intermediate point of said secondary winding to the other end of said load impedance, means for connecting one end of said secondary winding to the other end of said load impedance including a portion of the electron discharge path of one of said devices and one of said capacitors, and means for connecting the other end of said secondary winding to the other end of said load impedance including a portion of the electron discharge path of the other of said devices and the other of said capacitors, means for applying waves of high frequency to the primary winding of said transformer, said capacitors have low impedance at said high frequency, and means for rendering said electron discharge devices alternately conductive in response to successive pulses of low frequency.

7. In combination, a transformer having a primary winding and a secondary winding, an inductor, a pair of electron discharge devices each having an electron discharge path, a pair of capacitors, means for connecting each end of said secondary winding through a respective one of said capacitors to one end of said inductor, a resistance for coupling an intermediate point of said secondary winding to the other end of said load impedance, means for connecting one end of said secondary winding to the other end of said inductor including a portion of the electron discharge path of one of said devices and a third capacitor, and means for connecting the other end of said secondary winding to the other end of said inductor including a portion of the electron discharge path of the other of said devices and a fourth capacitor, means for applying waves of high frequency to the primary winding of said transformer, each capacitor of said third and fourth capacitors being of a value to resonate with said inductor at said high frequency, and means for rendering said discharge devices alternately conductive.

8. In combination, a transformer having a primary winding and a secondary winding, an inductor, a pair of electron discharge devices each having an electron discharge device, means for capacitively coupling each end of said secondary winding to one end of said load impedance, a resistance for coupling an intermediate point of said secondary winding to the other end of said load impedance, means for connecting one end of said secondary winding to the other end of said inductor including a portion of the electron discharge path of one of said devices and a capacitance, and means for connecting the other end of said secondary winding to the other end of said inductor including a portion of the electron discharge path of the other of said devices and another capacitance, circuit means for interconnecting said electron discharge devices whereby said devices are alternately rendered conductive in response to successive applied pulses, means for applying waves of high frequency to the primary of said transformer, and means for applying pulses of low frequency to said circuit means.

References Cited by the Examiner

UNITED STATES PATENTS 2,762,012 9/1956 Kaltenbacher ------- 232—119

ARTHUR GAUSS, *Primary Examiner*.

J. ZAZWORSKY, *Assistant Examiner*.